United States Patent
Stan et al.

(10) Patent No.: US 12,309,051 B2
(45) Date of Patent: May 20, 2025

(54) METHODS, SYSTEMS, AND COMPUTER READABLE MEDIA FOR TESTING A SYSTEM UNDER TEST USING CONGESTION CONTROL MONITORING

(71) Applicant: Keysight Technologies, Inc., Santa Rosa, CA (US)

(72) Inventors: Razvan Ionut Stan, Agoura Hills, CA (US); Christian Paul Sommers, Bangor, CA (US); Lyle Eugene Thompson, Mentone, CA (US); Russil Wvong, Vancouver (CA)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 478 days.

(21) Appl. No.: 17/968,512

(22) Filed: Oct. 18, 2022

(65) Prior Publication Data

US 2024/0129220 A1 Apr. 18, 2024

(51) Int. Cl.
*H04L 43/50* (2022.01)
*H04L 43/062* (2022.01)
*H04L 43/0864* (2022.01)

(52) U.S. Cl.
CPC ............ *H04L 43/50* (2013.01); *H04L 43/062* (2013.01); *H04L 43/0864* (2013.01)

(58) Field of Classification Search
CPC ... H04L 43/50; H04L 43/062; H04L 43/0864; H04L 43/0858; H04L 43/55; H04L 47/00
See application file for complete search history.

(56) References Cited

U.S. PATENT DOCUMENTS

| | | | |
|---|---|---|---|
| 6,314,531 B1 | 11/2001 | Kram | |
| 8,571,848 B2 | 10/2013 | Shin | |
| 10,135,709 B1* | 11/2018 | Segel | .................. G06F 11/3684 |
| 2013/0166774 A1 | 6/2013 | Pruthi et al. | |
| 2019/0235994 A1* | 8/2019 | Epperlein | ............... H04L 41/40 |
| 2020/0374751 A1* | 11/2020 | Krishnaswamy | ..... H04L 12/413 |
| 2022/0060422 A1 | 2/2022 | Sommers | |
| 2022/0116303 A1 | 4/2022 | Sommers | |
| 2022/0116304 A1 | 4/2022 | Sommers | |

(Continued)

OTHER PUBLICATIONS

"Traffic Management User Guide," Juniper Networks, pp. 1-1206 (Sep. 14, 2022).

(Continued)

*Primary Examiner* — Schquita D Goodwin (57) ABSTRACT

Methods, systems, and computer readable media for testing a system under test (SUT). An example system includes a fabric emulation device configured for emulating a data center switching fabric using emulated switch queues and for emulating one or more congestion control mechanisms for network traffic on the data center switching fabric from the SUT. The system includes a test execution manager configured for: executing a test case causing the fabric emulation device to invoke at least a first congestion control mechanism; logging one or more metrics characterizing the first congestion control mechanism in response to invoking the first congestion control mechanism, wherein logging the one or more metrics comprises logging at least one performance metric from at least one emulated switch queue of the fabric emulation device; and outputting a test report based on logging the one or more metrics.

20 Claims, 5 Drawing Sheets

(56) References Cited

U.S. PATENT DOCUMENTS

2022/0231904 A1\* 7/2022 Di Martino ............. H04L 43/50
2022/0253324 A1   8/2022 Liu et al.
2023/0224233 A1\* 7/2023 Hayes ..................... H04L 43/12
                                                                709/224

OTHER PUBLICATIONS

"In-band Network Telemetry (INT) Dataplane Specification," P4.org Applications Working Group, V2.1, pp. 1-56 (Nov. 11, 2020).
Floyd et al., "The Addition of Explicit Congestion Notification (ECN) to IP," Request for Comments: 3168, pp. 1-63 (Sep. 2001).

\* cited by examiner

METHODS, SYSTEMS, AND COMPUTER READABLE MEDIA FOR TESTING A SYSTEM UNDER TEST USING CONGESTION CONTROL MONITORING

TECHNICAL FIELD

The subject matter described herein relates to network testing. More specifically, the subject matter relates to methods, systems, and computer readable media for testing a system under test using congestion control monitoring.

BACKGROUND

Network operators typically test network nodes for reliability and other characteristics before deploying the network nodes to production environments (e.g., non-test environments). Generally, it is important to test networks nodes with various amounts of traffic and different types of traffic.

Data centers can include distributed systems (e.g., multiple servers, switches, and/or other devices in same building) used for performing various functions. Within a data center, some nodes may perform centralized functions (e.g., services or microservices, like authentication or data access) involved with handling user traffic or providing services to users. Issues can arise when testing and/or configuring a data center or a distributed system. For example, a network operator may use one or more network congestion control mechanisms to mitigate network congestion. However, significant time and testing resources may be needed to determine appropriate settings for effective network congestion control for various real-world scenarios.

SUMMARY

Methods, systems, and computer readable media for testing a system under test (SUT). An example system includes a fabric emulation device configured for emulating a data center switching fabric using emulated switch queues and for emulating one or more congestion control mechanisms for network traffic on the data center switching fabric from the SUT. The system includes a test execution manager configured for: executing a test case causing the fabric emulation device to invoke at least a first congestion control mechanism; logging one or more metrics characterizing the first congestion control mechanism in response to invoking the first congestion control mechanism, wherein logging the one or more metrics comprises logging at least one performance metric from at least one emulated switch queue of the fabric emulation device; and outputting a test report based on logging the one or more metrics.

An example method includes emulating, on a fabric emulation device, a data center switching fabric using a plurality of emulated switch queues; emulating, on the fabric emulation device, one or more congestion control mechanisms for network traffic on the data center switching fabric from the SUT; executing a test case causing the fabric emulation device to invoke at least a first congestion control mechanism; logging one or more metrics characterizing the first congestion control mechanism in response to invoking the first congestion control mechanism, wherein logging the one or more metrics comprises logging at least one performance metric from at least one emulated switch queue of the fabric emulation device; and outputting a test report based on logging the one or more metrics.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for testing a system under test (SUT). A test system (e.g., one or more computing platforms, devices, or nodes) can be configured for emulating data flows and evaluating the performance of disaggregated heterogenous compute systems. The test system can include test traffic generation and integrated monitoring capability for executing test scripts and producing and outputting test reports. More specifically, the subject matter relates to methods, systems, and computer readable media for testing a SUT using congestion control monitoring.

The test system can test within an emulated fabric using a fabric emulation device. The fabric emulation device can include physical application-specific integrated circuit (ASIC) switching resources and a switching environment emulator configured for emulating, using the physical ASIC switching resources, a data center switching fabric. The fabric emulation device can use congestion control mechanisms and emulated switch queues in the data center switching fabric. The test system can be configured for logging metrics characterizing the congestion control mechanisms, e.g., by logging at least one performance metric from an emulated switch queue of the fabric emulation device.

In some examples, the fabric emulation device emulates an internal programming protocol-independent packet processors (P4) pipeline. P4 is an open source, domain-specific programming language for network devices, specifying how data plane devices (switches, routers, NICs, filters, etc.) process packets. The test system can use the internal P4 pipeline (e.g., instead of inband network telemetry (INT)) to log metrics characterizing the congestion control mechanisms.

For example, suppose the system emulates or implements data center quantized congestion notification (DCQCN) including priority based flow control (PFC) and explicit congestion notification (ECN). In case of congestion, ECN will first be invoked and will remark packets downstream. If the congestion is not then solved and buffers get filled, PFC will be invoked to send upstream pause packets. If the sender does not reduce its transmission rate, the switch may start dropping packets.

Figure 1:
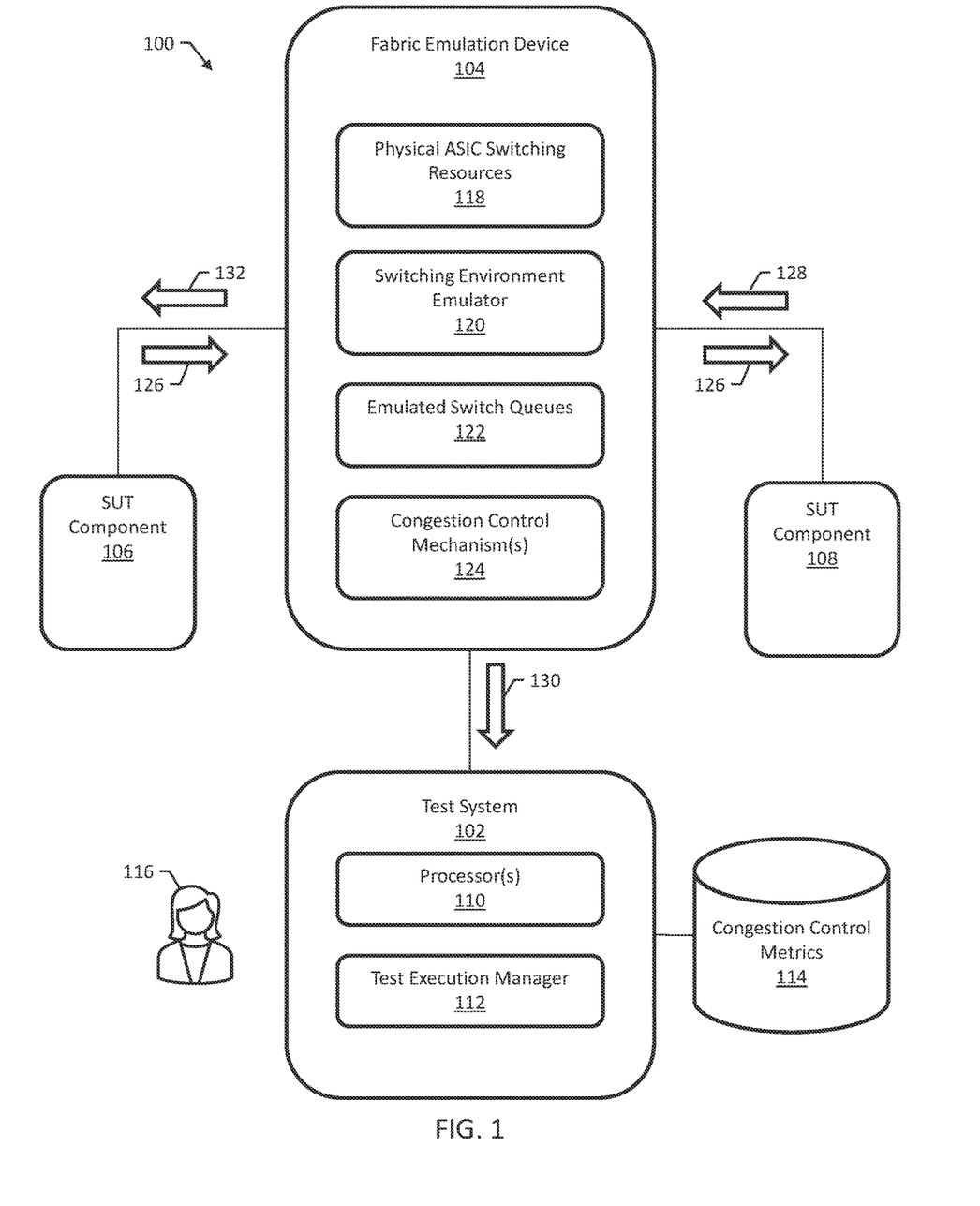
FIG. 1 is a block diagram of an example network test environment.

In that case, using the internal P4 pipeline, the test system can be configured to measure, e.g., one or more of:
- The latency between a first ECN remarked packet downstream and a congestion notification packet send by the destination back to the source to slow down
- The latency between a first ECN remarked packet downstream and a first pause frame sent upstream by the switch
- The latency between a first pause frame sent upstream by the switch and the moment the switch starts dropping packets FIG. 1 is a block diagram of an example network test environment 100. The network test environment 100 includes a test system 102, a fabric emulator device, 104, and a SUT comprising a first SUT component 106 and a second SUT component 108.

The test system 102 is a computer system comprising one or more processors 110 and memory storing executable instructions for the processors 110. The test system 102 includes a test execution manager 112 configured for executing at least one test case, logging one or more congestion control metrics 114, and outputting a test report, e.g., to a system administrator 116 on a display device. Outputting a test report can include, e.g., storing one or more reports in a database, providing results to a different computer system though an application programming interface (API), or any other appropriate processing of the test report.

The fabric emulation device 104 includes physical ASIC switching resources 118 and a switching environment emulator 120 configured for emulating, using the physical ASIC switching resources 118, a data center switching fabric using emulated switch queues 122. The system is configured to observe, by the packet processing pipeline, the emulated switch queues 122 for monitoring and reporting performance metrics information associated with emulated switching elements. The switching environment emulator is also configured for emulating one or more congestion control mechanisms 124 for network traffic on the data center switching fabric going between the first SUT component 106 and the second SUT component 108.

In operation, the test execution manager 112 logs congestion control metrics 114 characterizing the congestion control mechanisms 124 by logging performance metrics from the emulated switch queues 122. For example, the test execution manager may use an internal P4 pipeline implemented by the switching environment emulator for generating a timestamped log record of one or more congestion control events.

Each of the first and second SUT components 106 and 108 can include, e.g., a computer system or networking device. For example, of the first and second SUT components 106 and 108 can be a server having a remote direct memory access (RDMA) network interface controller (RNIC). The test execution manager 112 can execute a test case causing a first RNIC to send RDMA over converged ethernet (RoCE) traffic towards a second RNIC over the data center switching fabric. In some examples, transmission control protocol (TCP) can be used at the first and second SUT components 106 and 108. The system can be configured with data center TCP (DCTCP) congestion control set to react to ECN.

In some examples, SUT is configured, e.g., by a network interface card, for implementing (DCQCN) including priority-based flow control (PFC) and explicit congestion notification (ECN). DCQCN will react to ECN marked packets. Logging congestion control metrics can include one or more of: measuring a latency between a remarked ECN packet and a congestion notification packet; measuring a latency between a remarked ECN packet and a pause frame; and measuring a latency between a pause frame and a dropped packet. In general, the congestion control metrics can include any appropriate type of metrics for characterizing a congestion control mechanism.

Priority-based Flow Control (PFC) is a lossless transport and congestion relief feature that works by providing link-level flow control for each code point (priority) on a full-duplex Ethernet link. When the receive buffer on a switch interface fills to a threshold, the switch transmits a pause frame to the sender (the connected peer) to temporarily stop the sender from transmitting more frames. The buffer threshold must be low enough so that the sender has time to stop transmitting frames and the receiver can accept the frames already on the wire before the buffer overflows. In some examples, the switch may automatically set queue buffer thresholds to prevent frame loss.

When congestion forces one priority on a link to pause, all of the other priorities on the link continue to send frames. Only frames of the paused priority are not transmitted. When the receive buffer empties below another threshold, the switch sends a message that starts the flow again. However, depending on the amount of traffic on a link or assigned to a priority, pausing traffic can cause ingress port congestion and spread congestion through the network.

ECN enables end-to-end congestion notification between two endpoints on TCP/IP based networks. The two endpoints are an ECN-enabled sender and an ECN-enabled receiver. ECN must be enabled on both endpoints and on all of the intermediate devices between the endpoints for ECN to work properly. Any device in the transmission path that does not support ECN breaks the end-to-end ECN functionality.

The ECN protocol indicates congestion information by marking packets instead of dropping them. The destination of marked packets returns this congestion notification to the source. As a result, the source decreases its transmit rate. ECN notifies networks about congestion with the goal of reducing packet loss and delay by making the sending device decrease the transmission rate until the congestion clears, without dropping packets.

Data Center Quantized Congestion Notification (DCQCN) is a combination of ECN and PFC to support end-to-end lossless Ethernet. ECN helps overcome the limitations of PFC to achieve lossless Ethernet. The idea behind DCQCN is to allow ECN to do flow control by decreasing the transmission rate when congestion starts, thereby minimizing the time PFC is triggered, which stops the flow altogether.

The correct operation of DCQCN requires balancing two conflicting requirements:

Ensuring PFC is not triggered too early, that is, before giving ECN a chance to send congestion feedback to slow the flow.

Ensuring PFC is not triggered too late, thereby causing packet loss due to buffer overflow.

There are three important parameters that need to be calculated and configured properly to achieve the above key requirements:

Headroom Buffers—A PAUSE message sent to an upstream device takes some time to arrive and take effect. To avoid packet drops, the PAUSE sender must reserve enough buffer to process any packets it may receive during this time. This includes packets that were in flight when the PAUSE was sent, and the packets sent by the upstream device while it is processing the PAUSE message.

PFC Threshold—This is an ingress threshold. This is the maximum size an ingress priority group can grow to before a PAUSE message is sent to the upstream device. Each PFC priority gets its own priority group at each ingress port. PFC thresholds are set per priority group at each ingress port.

ECN Threshold—This is an egress threshold. Once an egress queue exceeds this threshold, the switch starts ECN marking for packets on that queue. For DCQCN to be effective, this threshold must be lower than the ingress PFC threshold to ensure PFC is not triggered before the switch has a chance to mark packets with ECN.

During operation, in the test environment 100, an emulated switch begins to congest and invokes both PFC and ECN congestion control mechanisms. As these congestion control mechanisms are invoked, metrics associated with their use are generated and logged by the test system 102. These metrics and logs can be analyzed and/or correlated by the test execution manager 112 and the results reported and/or displayed to a test system user 116. The user 116 may use the reported result information to manually adjust and/or tune various operational parameters associated with the SUT components 106 and 108.

To illustrate the test system 102, consider an example involving DCQCN signaling analysis and reporting. Suppose that the first and second SUT components 106 and 108 each include a server and a RNIC and the test execution manager 112 causes a first RNIC to send RoCE traffic towards a second RNIC over the data center switching fabric. The test execution manager 112 causes the system to invoke DCQCN, for example, by causing a sufficient volume of traffic to be transmitted to result in congestion. DCQCN signaling and associated metrics are observer, analyzed, and reported to the test system user 116. The following sequence of events happens:

1. Sender RNIC generates RDMA (RoCE) traffic 126 that is transmitted towards the receiver RNIC.
2. Congested switch implementing Explicit Congestion Notification (ECN) as part of Active Queue Management (AQM) signals congestion via ECN bits.
3. P4 processing pipeline component of the fabric emulation device 104 is configured to add an ECN marking to a packet associated with the congestion event and to generate a timestamped log record, which is sent to the test execution manager 112.
4. Receiver RNIC generates Congestion Notification Packets (CNPs) 128 back to sender.
5. P4 processing pipeline component of the fabric emulation device 104 is configured to detect the CNP 128 and to generate a timestamped log record 130, which is sent to the test execution manager 112.
6. Sender throttles packets using rate-control per DCQCN algorithm
7. Fabric switches implement PFC as part of Datacenter Converged Ethernet (DCE). If congestion hits PFC queue thresholds in fabric because DCQCN wasn't effective enough, PFC packets 132 may propagate back to sender.
8. P4 processing pipeline component of the fabric emulator device 104 is configured to detect the PFC/Pause Frame and to generate a timestamped log record 130, which is sent to the test execution manager 112.
9. Sender performs PFC throttling of packets to avoid packet drops in the emulated switch queues 122.
10. The test execution manager 112 correlates the received log information associated with the congestion event and generates a report.

Figure 2:
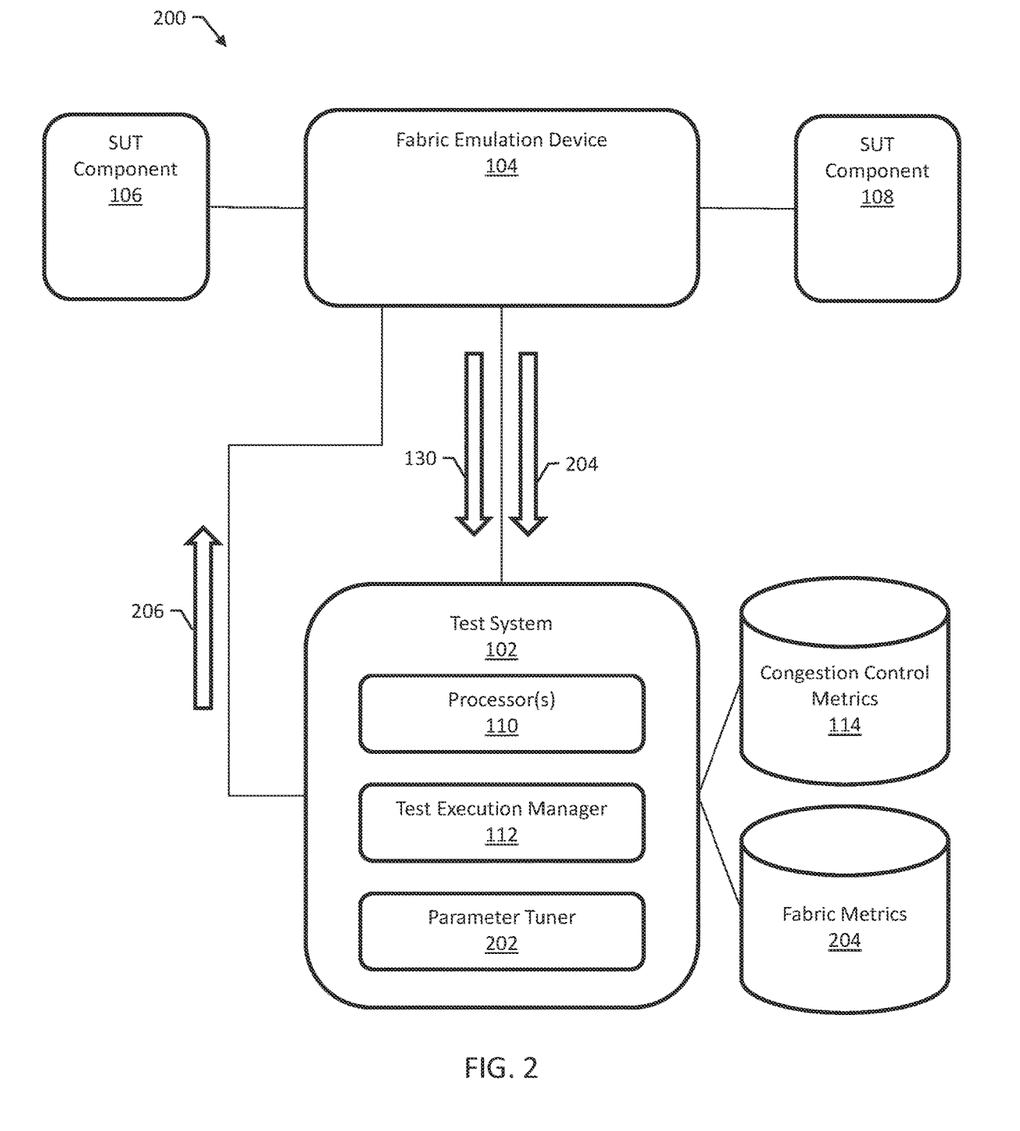
FIG. 2 is a block diagram of an example test environment for adjusting and/or tuning one or more congestion control parameters.

FIG. 2 is a block diagram of an example test environment 200 for adjusting and/or tuning one or more congestion control parameters. In general, the test system 102 can be used to test and tune congestion control performance characteristics and/or behaviors of any network devices that implement congestion control mechanisms.

To illustrate the operation of the environment 200, consider an example involving DCQCN signaling analysis and reporting. Suppose that the first and second SUT components 106 and 108 each include a server and a RNIC and the test execution manager 112 causes a first RNIC to send RoCE traffic towards a second RNIC over the data center switching fabric. The test execution manager 112 causes the system to invoke DCQCN, for example, by causing a sufficient volume of traffic to be transmitted to result in congestion.

An emulated switch begins to congest and invokes both PFC and ECN congestion control mechanisms. As these congestion control mechanisms are invoked, metrics 130 associated with their use are generated and logged by the test system 102. These metrics 130 can be analyzed and/or correlated by the test execution manager 112 and the results reported and/or displayed to a test system user 116. The user 116 may use the reported result information to manually adjust and/or tune various operational parameters associated with the SUT components 106 and 108.

In addition to logging congestion control mechanism metrics, the test system 102 can be configured to log emulated switch metrics 204 from the fabric emulation device 104. Emulated switch metrics 204 can include, for example, buffer depths and/or queue depths during execution of a test, or CNP response timeout information. The logged information 204 is analyzed and/or correlated and fed to a switching fabric parameter tuner 202 associated with the test system 102 that is used to automatically suggest or implement switching fabric configuration parameter adjustments 206, which serve to tune and/or optimize congestion control performance of the SUT components 106 and 108 and the fabric emulation device 104.

Figure 3:
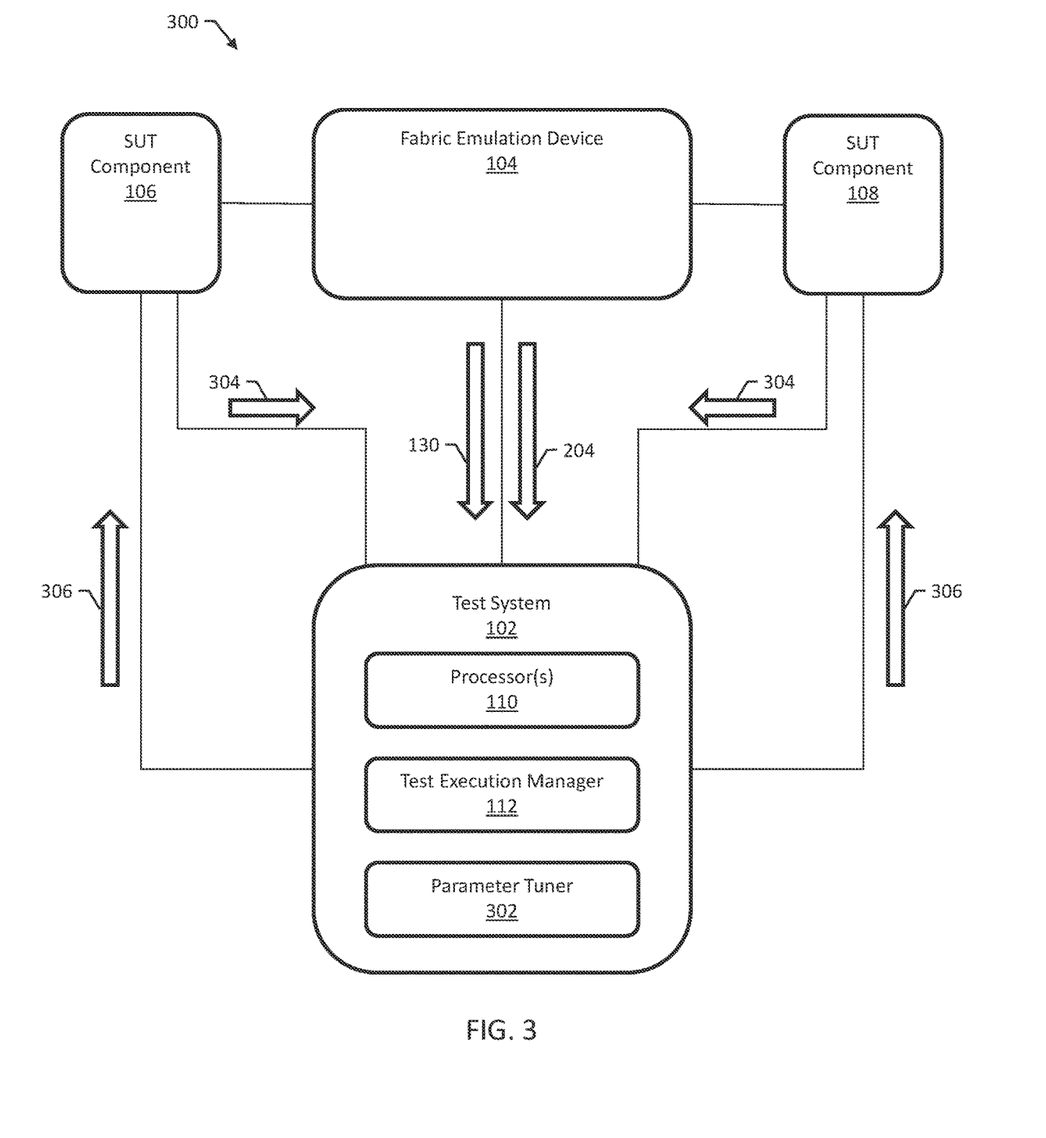
FIG. 3 is a block diagram of an example test environment for active feedback tuning.

FIG. 3 is a block diagram of an example test environment 300 for active feedback tuning. In general, the test system 102 can be used to test and tune congestion control performance characteristics and/or behaviors of any network devices that implement congestion control mechanisms.

To illustrate the operation of the environment 300, consider an example involving DCQCN signaling analysis and reporting. Suppose that the first and second SUT components 106 and 108 each include a server and a RNIC and the test execution manager 112 causes a first RNIC to send RoCE traffic towards a second RNIC over the data center switching fabric. The test execution manager 112 causes the system to invoke DCQCN, for example, by causing a sufficient volume of traffic to be transmitted to result in congestion.

An emulated switch begins to congest and invokes both PFC and ECN congestion control mechanisms. As these congestion control mechanisms are invoked, metrics 130 associated with their use are generated and logged by the test system 102. These metrics 130 can be analyzed and/or correlated by the test execution manager 112 and the results reported and/or displayed to a test system user 116. The user 116 may use the reported result information to manually adjust and/or tune various operational parameters associated with the SUT components 106 and 108.

In addition to logging congestion control mechanism metrics, the test system 102 can be configured to log emulated switch metrics 204 from the fabric emulation device 104 and/or other host information 304. The logged information is analyzed and/or correlated and fed to an endpoint parameter tuner 302 associated with the test system 102 that is used to automatically suggest or implement endpoint device configuration parameter adjustments 306, which serve to tune and/or optimize congestion control performance of the SUT components 106 and 108 and the fabric emulation device 104.

The host information 304 can include, for example, overall job completion time, retransmission, average throughput, and the like. The host information 304 can be collected, for example, via a test system software agent that is installed on physical endpoint devices such as SUT components 106 and 108. In some examples, the test system 102 can communicate configuration parameter information 306 to an endpoint device under test via, for example, a general purpose management interface associated with the device, or via a specially implemented interface that is used by the test system 102 to communicate parameter adjustment information.

The parameter tuner 302 shown in FIG. 3 can also include the features of the parameter tuner 202 shown in FIG. 2, so that the test system 102 can be configured for tuning the fabric emulation device 104 or the endpoints or both by dynamically adjusting configuration parameters, logging performance metrics in response, and then continuing to adjust configuration parameters.

Figure 4:
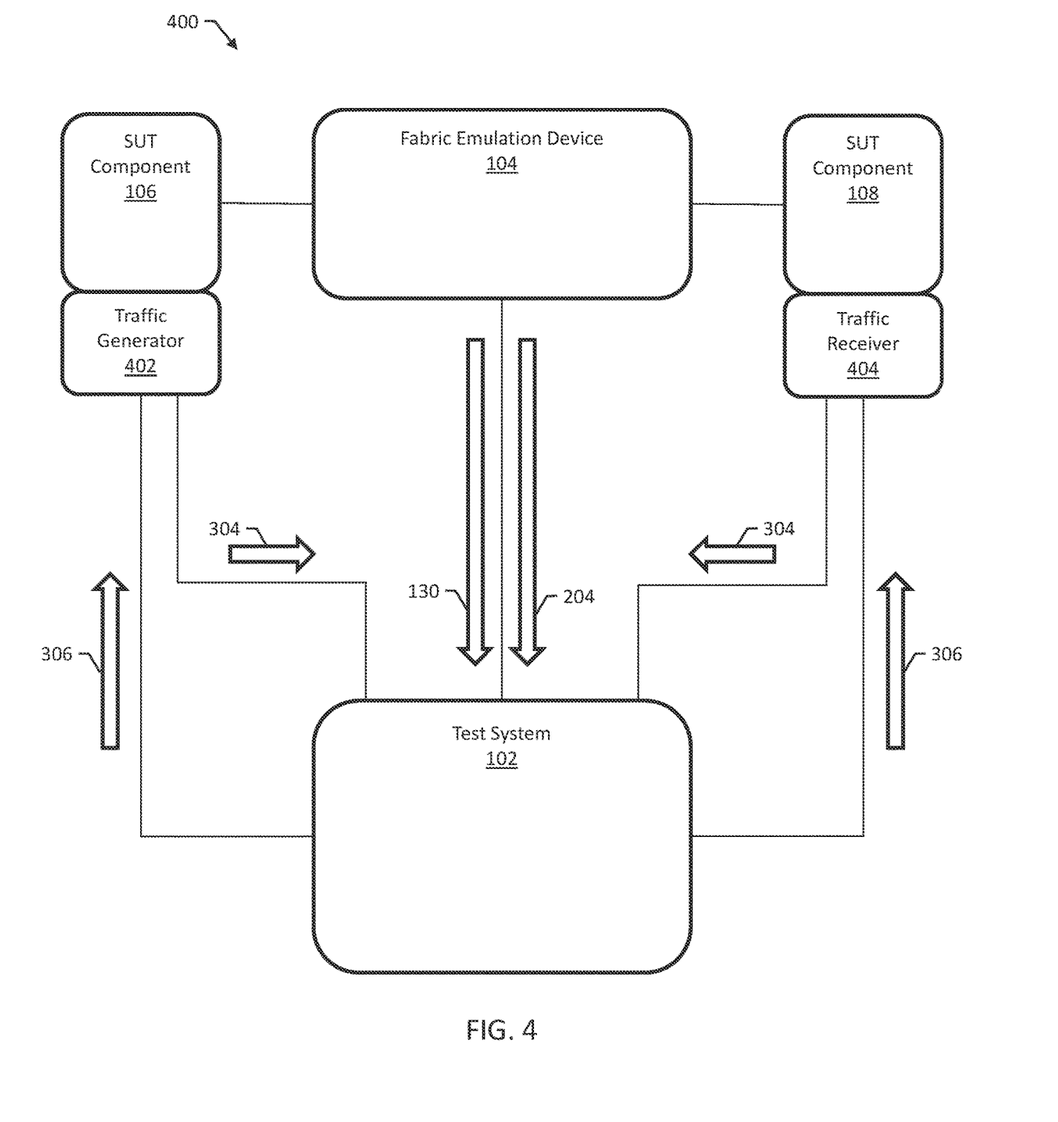
FIG. 4 is a block diagram of an example test environment with an emulated data center fabric and emulated background traffic.

FIG. 4 is a block diagram of an example test environment 400 with an emulated data center fabric and emulated background traffic. In general, the test system 102 can be used to test and tune congestion control performance characteristics and/or behaviors of any network devices that implement congestion control mechanisms.

To illustrate the operation of the environment 400, consider an example involving DCQCN signaling analysis and reporting. Suppose that the first and second SUT components 106 and 108 each include a server and a RNIC and the test system 102 causes a first RNIC to send RoCE traffic towards a second RNIC over the data center switching fabric. The test system 102 causes the system to invoke DCQCN, for example, by causing a sufficient volume of traffic to be transmitted to result in congestion.

An emulated switch begins to congest and invokes both PFC and ECN congestion control mechanisms. As these congestion control mechanisms are invoked, metrics 130 associated with their use are generated and logged by the test system 102. These metrics 130 can be analyzed and/or correlated by the test system 102.

In addition to logging congestion control mechanism metrics, the test system 102 can be configured for testing with synthetic background traffic. During execution of a test, synthetic traffic can be generated by a traffic generator 402 (e.g., hardware and/or software integrated with or in the first SUT component 106) and used to load the emulated switching fabric with background traffic which is received by a traffic received 404 (e.g., hardware and/or software integrated with or in the second SUT component 108).

Figure 5:
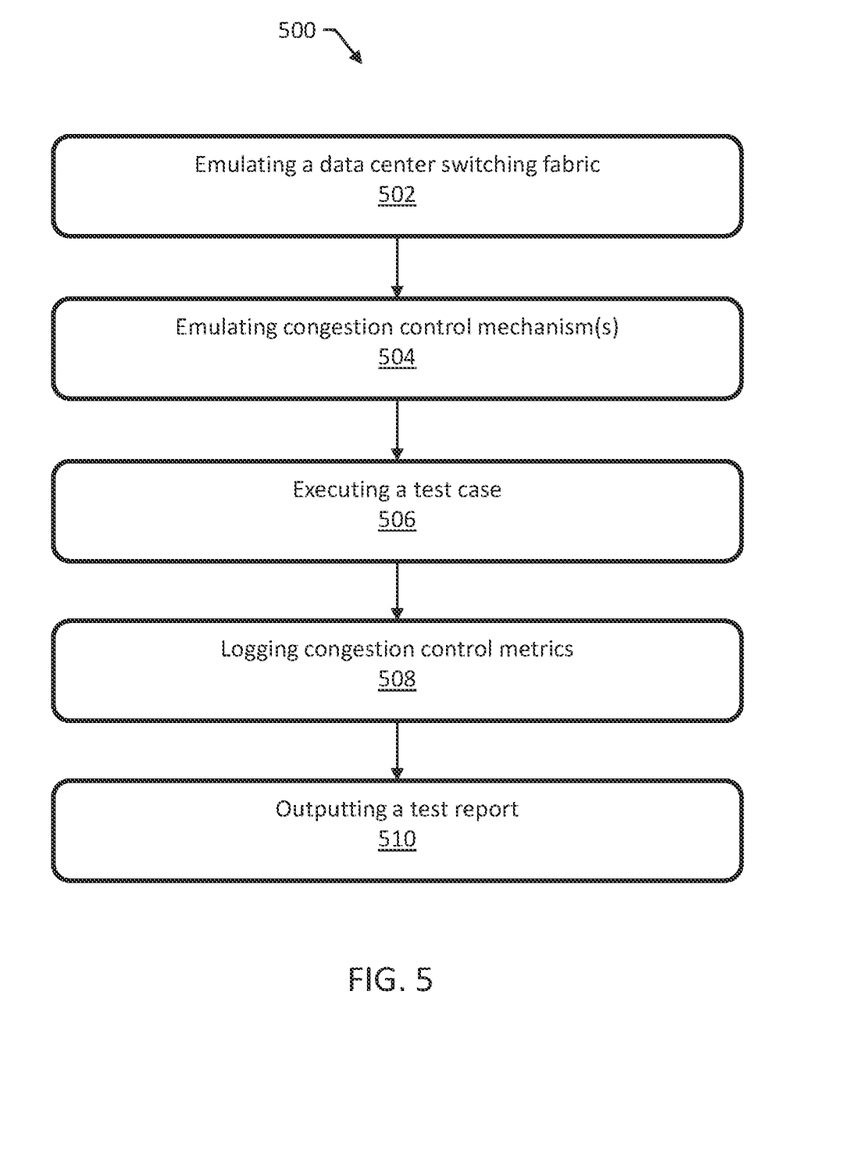
FIG. 5 is a flow diagram of an example method for testing a system under test using congestion control monitoring.

FIG. 5 is a flow diagram of an example method 500 for testing a system under test using congestion control monitoring. The method 500 can be performed, for example, by the test system 102 and fabric emulation device 104 of FIG. 1.

The method 500 includes emulating, on a fabric emulation device, a data center switching fabric using emulated switch queues (502). The method 500 includes emulating, on the fabric emulation device, one or more congestion control mechanisms for network traffic on the data center switching fabric from the SUT (504).

The method 500 includes executing a test case causing the fabric emulation device to invoke at least a first congestion control mechanism (506). The method 500 includes logging one or more metrics characterizing the first congestion control mechanism in response to invoking the first congestion control mechanism (508).

Logging the one or more metrics includes logging at least one performance metric from at least one emulated switch queue of the fabric emulation device. The method 500 includes outputting a test report based on logging the one or more metrics (510).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a system under test (SUT), the method comprising:

emulating, on a fabric emulation device, a data center switching fabric using a plurality of emulated switch queues;

emulating, on the fabric emulation device, one or more congestion control mechanisms for network traffic on the data center switching fabric from the SUT;

executing a test case causing the fabric emulation device to invoke at least a first congestion control mechanism;

logging one or more metrics characterizing the first congestion control mechanism in response to invoking the first congestion control mechanism, wherein logging the one or more metrics comprises logging at least one performance metric from at least one emulated switch queue of the fabric emulation device; and outputting a test report based on logging the one or more metrics.

2. The method of claim 1, wherein the fabric emulation device comprises physical application-specific integrated circuit (ASIC) switching resources and a switching environment emulator configured for emulating, using the physical ASIC switching resources, the data center switching fabric.

3. The method of claim 1, wherein logging the one or more metrics comprises generating a timestamped log record of one or more congestion control events.

4. The method of claim 1, wherein the SUT comprises at least a first remote direct memory access (RDMA) network interface controller (RNIC) and a second RNIC, and wherein executing the test case comprises causing the first RNIC to send RDMA over converged ethernet (RoCE) traffic towards the second RNIC over the data center switching fabric.

5. The method of claim 1, wherein emulating one or more congestion control mechanisms comprises emulating data center quantized congestion notification (DCQCN) including priority based flow control (PFC) and explicit congestion notification (ECN).

6. The method of claim 5, wherein logging the one or more metrics comprises measuring a latency between a remarked ECN packet and a congestion notification packet.

7. The method of claim 5, wherein logging the one or more metrics comprises measuring a latency between a remarked ECN packet and a pause frame.

8. The method of claim 5, wherein logging the one or more metrics comprises measuring a latency between a pause frame and a dropped packet.

9. The method of claim 1, comprising automatically determining at least one switching fabric congestion control configuration parameter adjustment based on the one or more metrics characterizing the first congestion control mechanism.

10. The method of claim 9, comprising iteratively tuning the one or more congestion control mechanisms by repeatedly executing the test case and automatically determining the switching fabric congestion control configuration parameter adjustment.

11. A system for testing a system under test (SUT), the system comprising:
 a fabric emulation device configured for emulating a data center switching fabric using a plurality of emulated switch queues and for emulating one or more congestion control mechanisms for network traffic on the data center switching fabric from the SUT;
 a test execution manager configured for:
  executing a test case causing the fabric emulation device to invoke at least a first congestion control mechanism;
  logging one or more metrics characterizing the first congestion control mechanism in response to invoking the first congestion control mechanism, wherein logging the one or more metrics comprises logging at least one performance metric from at least one emulated switch queue of the fabric emulation device; and
  outputting a test report based on logging the one or more metrics.

12. The system of claim 11, wherein the fabric emulation device comprises physical application-specific integrated circuit (ASIC) switching resources and a switching environment emulator configured for emulating, using the physical ASIC switching resources, the data center switching fabric.

13. The system of claim 11, wherein logging the one or more metrics comprises generating a timestamped log record of one or more congestion control events.

14. The system of claim 11, wherein the SUT comprises at least a first remote direct memory access (RDMA) network interface controller (RNIC) and a second RNIC, and wherein executing the test case comprises causing the first RNIC to send RDMA over converged ethernet (RoCE) traffic towards the second RNIC over the data center switching fabric.

15. The system of claim 11, wherein emulating one or more congestion control mechanisms comprises emulating data center quantized congestion notification (DCQCN) including priority based flow control (PFC) and explicit congestion notification (ECN).

16. The system of claim 15, wherein logging the one or more metrics comprises measuring a latency between a remarked ECN packet and a congestion notification packet.

17. The system of claim 15, wherein logging the one or more metrics comprises measuring a latency between a remarked ECN packet and a pause frame.

18. The system of claim 15, wherein logging the one or more metrics comprises measuring a latency between a pause frame and a dropped packet.

19. The system of claim 11, wherein the test execution manager is configured for automatically determining at least one switching fabric congestion control configuration parameter adjustment based on the one or more metrics characterizing the first congestion control mechanism.

20. The system of claim 19, wherein the test execution manager is configured for iteratively tuning the one or more congestion control mechanisms by repeatedly executing the test case and automatically determining the switching fabric congestion control configuration parameter adjustment.

* * * * *